United States Patent
Koller

[15] 3,703,189
[45] Nov. 21, 1972

[54] DRAIN VALVE
[72] Inventor: Floyd G. Koller, Dayton, Ohio
[73] Assignee: Auto-Valve, Inc., Dayton, Ohio
[22] Filed: Jan. 31, 1969
[21] Appl. No.: 795,458

[52] U.S. Cl..............................137/329.06, 251/144
[51] Int. Cl. .................F16k 31/528, F16k 43/00
[58] Field of Search..........137/315, 316, 329–329.6, 137/344, 512, 539, 599.2; 251/100, 144, 330

[56] References Cited

UNITED STATES PATENTS 2,796,882  6/1957  Bradley ................137/329.4
2,983,385  5/1961  Botstiber..............137/329.06
3,022,797  2/1962  Allin......................251/144 X
3,370,827  2/1968  Stehlin..................251/144 X Primary Examiner—M. Cary Nelson
Assistant Examiner—David R. Matthews
Attorney—Dybvig and Dybvig

[57] ABSTRACT

A drain valve is so designed that its primary seal can be removed and replaced without substantial loss of fluid through its drain port. For this purpose, the valve member carrying the primary seal has a secondary seal adapted to close the drain port.

8 Claims, 9 Drawing Figures

INVENTOR.
Floyd G. Koller
BY
Dybvig and Dybvig
His Attorneys 3,703,189

INVENTOR.
Floyd G. Koller
BY Dybvig & Dybvig
His Attorneys

DRAIN VALVE

This invention relates to drain valves and particularly to drain valves of the type used in aircraft fuel tanks and similar applications.

Typical drain valves of this type have a valve member which seals against a conical seat surrounding a drain port. The drain port is opened by engaging the external surface of the valve member and pushing it into the valve housing. Usually the valve member can be locked by rotation in its open position. In the past, these drain valves had to be completely replaced if they began to leak. To remove a faulty valve, the fuel tank had to be emptied and then opened to provide access to the internal valve mounting. Since the primary cause of valve failure is deterioration of its main drain port seal, drain valves have recently been designed which can be partially disassembled from outside the tank for removal of the valve member carrying the seal. These valves normally have a supplementary valving arrangement for preventing a substantial loss of fuel when partially disassembled. Known valves of the latter type are relatively complex and require complete removal of parts of the valve. Of course, disassembly is time consuming and the danger always exists that the removed parts may be lost.

An object of this invention is to provide a simple, inexpensive drain valve so constructed that its drain port seal can be exposed without disassembly of the valve and without substantial loss of fluid through the drain port. The drain port seal of a valve constructed in accordance with this invention can routinely be inspected, and replaced if necessary, in a few seconds. For this purpose, the drain port and the movable valve member are so constructed that the valve member can be projected partially out of the drain port to expose the seal. The valve member has a secondary seat which closes the drain port when the seal is thus exposed.

Another object of this invention is to so construct a drain valve that it can be opened as well as repaired merely by manipulation of the exposed face of the drain valve. In accordance with this invention, the exposed face of the drain valve is designed to receive a screwdriver or other tool which can be used to push the valve member into an open position and, when open, the valve member can be rotated to lock it in an open position. To expose the drain port seal for replacement, the drain valve can also be rotated, preferably in one direction only, to release the valve member so that it may partially extend out of the drain port. It is also an object of this invention to provide such a valve having its exposed face flush with the adjacent tank surface.

Other objects and advantages will become apparent from the following description and the drawings in which:

In FIG. 1 the drain valve is closed;

In FIG. 2 the valve is open;

Figure 1:
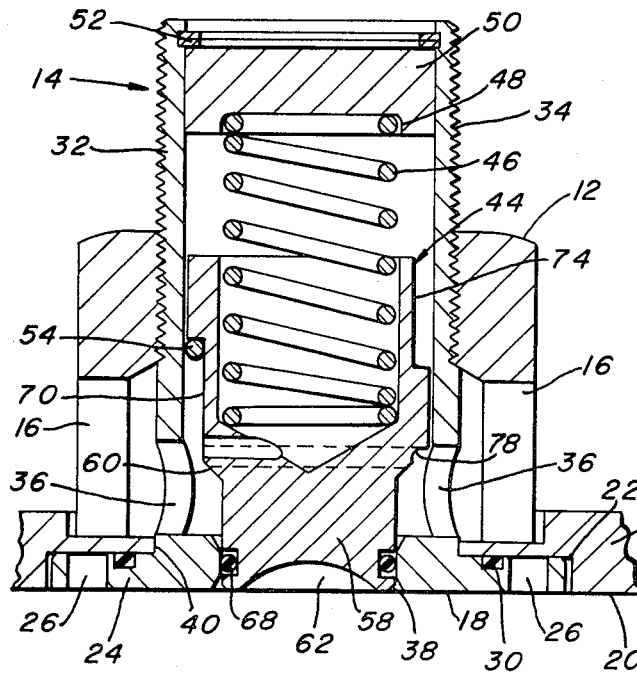
FIG. 1 is a cross sectional view of a portion of a fuel tank or the like and a drain valve in accordance with this invention mounted therein.

FIG. 1 illustrates the wall of a fuel tank, designated 10, inside of which is mounted an internally threaded drain valve adapter nut 12 for receiving an externally threaded drain valve, generally designated 14. The adapter nut 12 has a plurality of openings 16 providing fluid communication between the inside of the fuel tank and the drain valve 14. The exposed face 18 of the drain valve 14 is desirably flush with the tank outer face 20 of the wall 10. For this purpose a portion of the tank outer face 20 is recessed as indicated at 22 to receive a circular plate portion 24 of the valve 14 which will be further described below. To assemble the valve 14 to the tank wall 10, its body is extended through an opening in the tank wall 10 and held by a spanner wrench (not shown) engaged in spaced holes 26 in the plate portion 24. While the valve 14 is so held, the adapter nut 12 is rotated from inside the tank to tightly draw the plate portion 24 against the recessed outer face portion 22. The valve plate portion 24 is annularly grooved at 28 to receive an O-ring 30 surrounding the opening in the wall 10.

The housing for the valve member 14 comprises a primarily tubular or hollow cylindrical main body 32 (FIG. 5) open at its upper end and exteriorly threaded as indicated at 34 for threaded engagement with the adapter nut 12. The lower part of the housing body 32 has inlet ports 36 opening, through the adapter nut openings 16, to the inside of the tank. The base of the housing body 32 comprises the aforementioned valve plate portion 24 which has a centrally located drain port 38 opening through the wall thereof which is coaxial with the longitudinal axis of the valve body 32. The center part of the plate portion 24 has an upstanding circular boss 40 snugly received by the aperture in the tank wall 10. Adjacent its open upper end, the housing body 32 has an internal annular groove 42.

Figure 2:
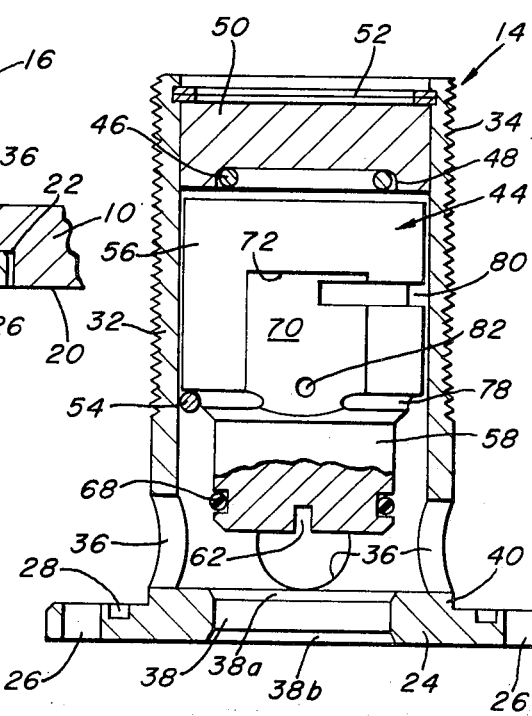
FIG. 2 illustrates the drain valve of FIG. 1 with the valve housing in vertical section and a movable valve member in elevation, part of which has been broken away.
Figure 3:
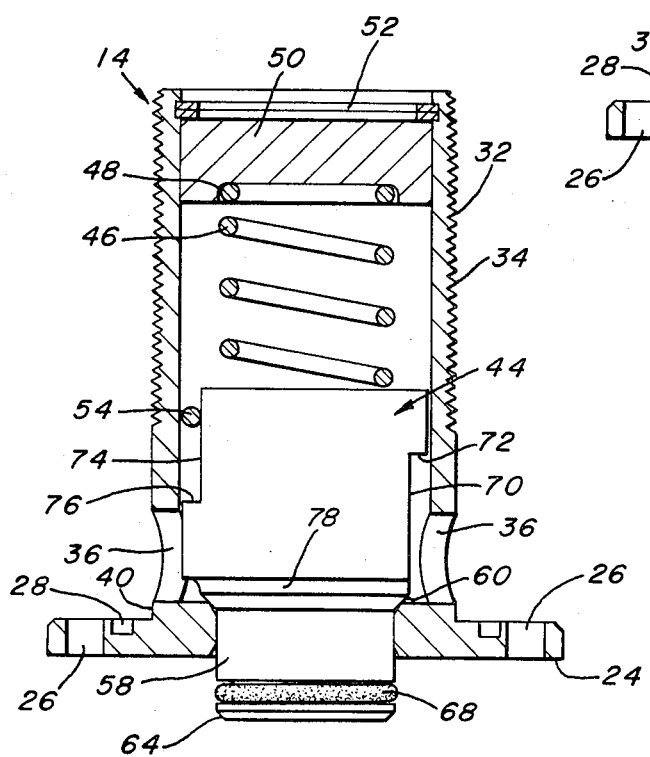
FIG. 3 is a view similar to FIG. 2 showing the valve member partially extended out of the valve housing for exposure of its drain port seal and with the drain port closed by a secondary seal.
Figure 4:
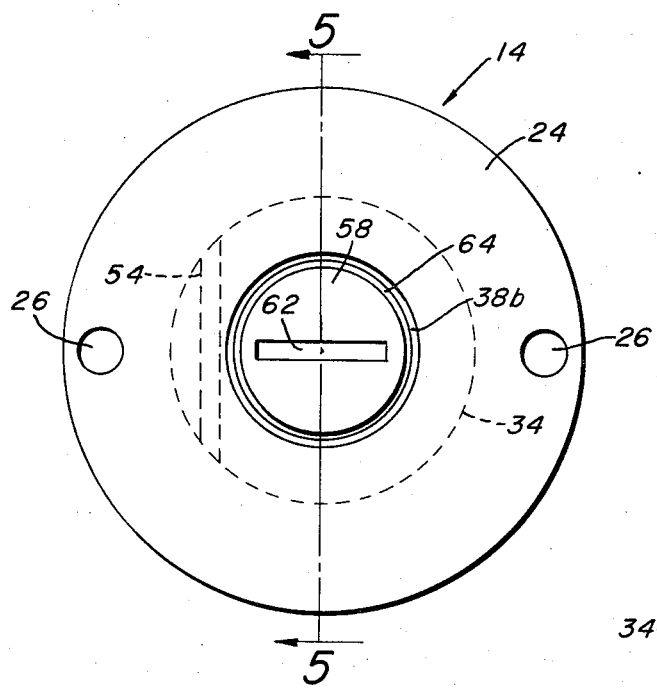
FIG. 4 is an elevational view of the exposed end of the movable valve member of FIG. 1.
Figure 5:
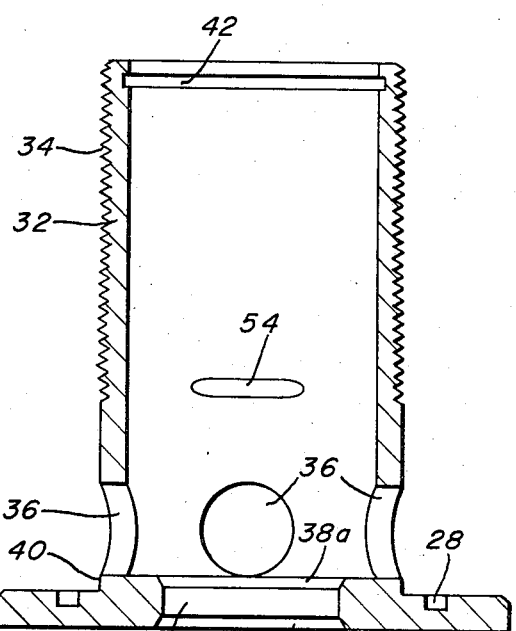
FIG. 5 is a vertical section of the body of the valve housing taken along line 5—5 of FIG. 4.
Figure 6:
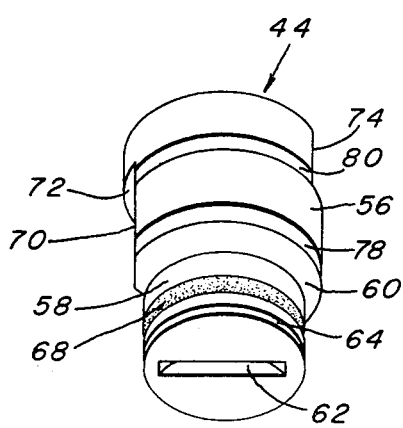
FIG. 6 is a perspective view of the movable valve member.
Figure 7:
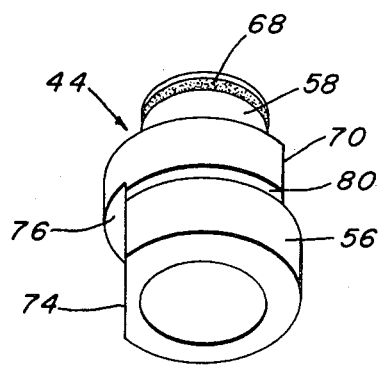
FIG. 7 is another perspective view of the movable valve member as viewed generally from the end thereof opposite from that of FIG. 6.
Figure 8:
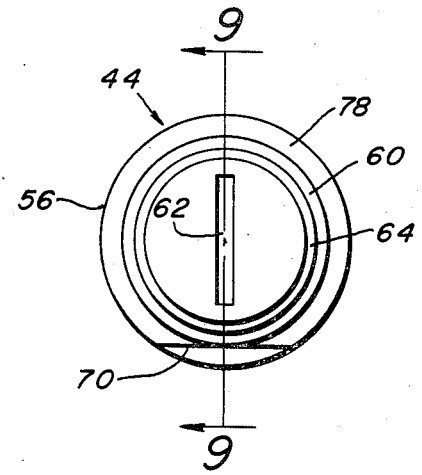
FIG. 8 is an elevational view of the exposed end of the movable valve member.

Referring to FIGS. 1, 2 and 3, the drain valve 14 can be assembled from the top of the housing 32 and further includes a movable hollow valve member or poppet 44, described in detail below, biased toward the drain port 38 by a coiled valve spring 46. One end of the valve spring 46 is received within the hollow inner end of the valve member 44 and the other end is received within a circular recess 48 in a housing cap 50 snugly located within the open upper end of the housing body 32 and held therein by a spring retaining member 52 located in the aforementioned internal groove 42. Since the valve spring 46 is coaxial with the housing body 32 and the valve member 44, it tends to center the valve member 44. The manner in which the spring 46 is confined permits the valve member 44 to be rotated about its longitudinal axis. The movable valve member 44 is freely slidable in the hollow interior of the housing body 32 between the housing cap 50 and the valve plate portion 24 except as limited by an abutment means. As best illustrated in FIGS. 4 and 5, the abutment means can conveniently comprise a transversely extending pin 54, the ends of which are located in mating apertures in the wall of the housing body 32 and the midportion of which projects into the hollow interior of the housing body 32 closely adjacent the inner surface thereof.

Referring to FIGS. 6, 7, 8 and 9, the movable valve member or poppet 44 is generally cylindrical and has a hollow body portion 56, the external diameter of which is only slightly smaller than the internal diameter of the housing body 32, and the internal diameter of which is sufficiently large to receive the coil spring 46. Extending forwardly from and coaxially with the body portion 56 is a solid, cylindrical reduced diameter shank portion 58 that is separated from the body portion 56 by a forwardly sloping shoulder 60. The free end of the shank portion 58 is, as shown in FIG. 1, normally flush with the outer face 20 of the plate portion 24 and has a notch 62 therein for engagement and manipulation by a screwdriver or other tool. Spaced inwardly from the end edge, designated 64, of the shank 58 is an annular groove 66 which is concentric with the longitudinal axis of the valve member 44 and is adapted to receive an O-ring or the like drain port seal 68. The end edge 64 is beveled to permit the seal 68 to be readily assembled thereon.

Referring again to FIGS. 6 through 9, the body portion 56 has a first planar surface or "flat" 70 in its outer periphery spaced from the inner, open end thereof and terminating at the sloping shoulder 60. The flat 70 has a base 72 which is in a plane perpendicular to the longitudinal axis of the valve member 44 and which faces the drain port 38. As will be described below, the base 72 constitutes a stop surface cooperating with the abutment pin 54. The outer periphery of the valve member 44 also has a second planar surface or flat 74 circumferentially spaced from and parallel to the first flat 70. The second flat 74 terminates at the inner, open end of the valve member 44 and has a base 76 spaced from the shoulder 60 which also is perpendicular to the longitudinal axis of the valve member 44 but faces away from the drain port 38. In addition to the foregoing, the valve member 44 has a first annular groove 78, for convenience called a locking groove, cut in the outer periphery of the body portion 56 and the shoulder 60 concentrically with the longitudinal axis thereof. The locking groove 78 may extend through substantially 360° so that its ends terminate on both sides of the first flat 70. A second concentric and annular groove 80, for convenience called a transition groove, extends through an arc of substantially 180° in the outer periphery of the body portion 56. The ends of the transition groove 80 terminate at the flats 70 and 74 closely adjacent to their respective bases or stop surfaces 72 and 76. Both grooves 78 and 80 are sufficiently wide and deep to receive the abutment pin 54.

Referring to FIGS. 1, 2 and 3, the flats 70 and 74 are separated from the inside wall of the housing body 32 by a spacing slightly greater than the transverse extension of the abutment pin 54 toward the longitudinal axis of the housing body 32. The axial spacing between the base or stop surface 72 of the first flat 70 from the groove 66 carrying the drain port seal 68 is substantially the same as the axial spacing between the abutment pin 54 and the drain port 38. In the normal closed position of the valve shown in FIG. 1, accordingly the first flat 70 confronts the abutment pin 54. In this position the valve spring 46 biases the valve member 44 downwardly toward the drain port 38 but movement of the shank 58 through the drain port 38 is prevented by the interengagement of the stop surface 72 of the flat 70 with the abutment pin 54. The drain port 38 can be opened by inserting a screwdriver or other tool into the notch 62 and pushing the valve member 44 upwardly away from the drain port 38 against the bias of the spring 46. Fluid, accordingly, can flow from the tank through the adapter opening 16 and the inlet ports 36 and out the drain port 38.

The valve member 44 can conveniently be locked in its open position merely by rotating the valve member 44 when fully open, whereupon the locking groove 78 receives the abutment pin 54, as shown in FIG. 2. The groove 78 extends through nearly 360° so that the valve member 44 may be locked open by either clockwise or counterclockwise rotation. As a practical matter, the person opening the valve will normally rotate the valve member 44 in a clockwise direction to lock it in an open position. The valve member 44 can then be rotated in a counterclockwise direction to replace the flat 70 adjacent the abutment pin 54 to permit the valve member 44 to be returned to its FIG. 1 position by the spring 46.

When it is desired to inspect or replace the drain port seal 68, the valve member 44 is so manipulated that the pin 54 is received by the transition groove 80. Starting at the normally closed position of the valve member 44 shown in FIG. 1, it is first moved slightly inwardly from the drain port 38 to position the transition groove 80 in alignment with the abutment pin 54. The valve member 44 is then rotated in a counterclockwise direction through 180°, whereupon the flat 74 is positioned adjacent the abutment pin 54. The abutment pin 54, therefore, no longer prevents movement of the valve member 44 toward the drain port 38 and the valve member 44 is thrust toward the drain port 38 by the valve spring 46. The valve member 44 is thus positioned as illustrated in FIG. 3 wherein it will be noted that the movement of the valve member 44 toward the drain port 38 is restricted only by the interengagement of the sloping shoulder 60 with the internal wall of the valve plate portion 24 in encircling relation to the drain port 38. The shoulder 60 acts as a secondary sealing surface which seats against the valve plate portion 24 to close the drain port 38 to permit inspection or removal of the drain port seal 68. Preferably the outer diameter of the valve member shank 58 is only slightly smaller than the minimum diameter of the drain port 38 whereby only an insignificant quantity of fuel or other contained fluid will be lost as the valve member 44 drops from the position shown in FIG. 1 to that shown in FIG. 3. It I will be noted that the drain port 38 is generally cylindrical and is of a width significantly greater than the effective width of the drain port seal 68 when engaged therewith. Accordingly, the valve member 44 can be depressed sufficiently to position the transition groove 80 in alignment with the abutment pin 54 without opening the drain port 38. The drain port 38 therefore remains closed during the 180° rotation of the valve member 44 from the FIG. 1 position to the position whereat the flat 74 confronts the abutment pin 54 and until the tool used to manipulate the valve member 44 is then removed.

The inner and outer edges, designated 38a and 38b, respectively, of the drain port 38 are beveled so that when the valve member 44 is returned from either the FIG. 2 or the FIG. 3 position to the FIG. 1 position, the beveled surfaces 38a and 38b tend to cam or guide the drain port seal 68 into the cylindrical center portion of the drain port 38. The inner beveled edge 38a is preferably beveled on an angle different from the shoulder 60 so that a line contact or seal is provided therebetween.

It is believed apparent that the valve member 44 may be returned from the FIG. 3 position to the FIG. 1 position merely by again engaging a tool in the notch 62 and pushing the valve member 44 upwardly against the bias of the spring 46 until the flat base 76 strikes the abutment pin 54. At this point the drain port 38 is again closed by the drain port seal 68. The valve member 44 is then rotated in a clockwise direction, the groove 80 being aligned with the abutment pin 54, through 180°, whereupon the flat 70 again confronts the abutment pin 54. When the tool is then removed from the notch 62, the valve member 44 drops slightly until the flat base 72 again engages the abutment pin 54 as shown in FIG. 1.

From the foregoing it can be seen that the objects of the invention have been met. No disassembly is required for inspection or replacement of the main drain port seal 68 and only a minimal amount of fluid is lost when the seal 68 is exposed. The manipulation of the valve member 44 is very simple. In the normal closed position of the valve member 44, the interengagement of the abutment pin 54 and the large diameter portion of the valve member 44 prevent any significant rotation of the valve member 44. To lock in an open position, the valve member 44 is simply fully depressed by axially directed inward movement and then rotated to be received by the locking groove 78.

As a precaution, the manipulation of the valve member 44 required to expose the drain port seal 68 is not quite so simple. The transition groove 80 is spaced sufficiently from the normal stop surface 72 that it must be "hunted" when depressing the valve member 44. Also, as viewed from the front of tee valve member 44, the transition groove 80 preferably extends only in a clockwise direction from the first flat 70 to the second flat 74. Therefore, even after the transition groove 80 is properly aligned with the abutment pin 54, the valve member 44 can only be turned in the unnatural, counterclockwise direction. To return the valve member 44 from the FIG. 3 to the FIG. 1 position, it is simply moved inwardly until the return stop surface 76 engages the abutment pin 54. The end of the transition groove 80 is sufficiently close to the return stop surface 76 that it is then automatically aligned with the abutment pin 54. No hunting, therefore, is required before rotating the valve member 44 in a clockwise direction to return if to the FIG. 1 position.

Figure 9:
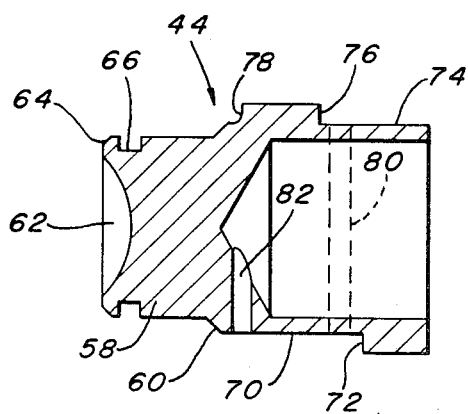
FIG. 9 is a sectional view of the valve member as viewed in the direction of arrows 9—9 of FIG. 8.

It should be apparent that the valve 14 may be constructed from a variety of materials, aluminum being normally preferred for aircraft fuel tanks. Drain valves are used in fuel tanks to drain water condensates. If the valve housing 16 and the valve member 44 are formed from aluminum and the valve spring 46 from a dissimilar metal, such as stainless steel, an accumulation of water in the hollow interior of the valve body portion 56 would create a highly corrosive condition. To avoid this circumstance, a drain passageway 82 desirably extends through the wall of the valve member 44 as best shown in FIG. 9.

Having thus described my invention, I claim:

1. In a drain valve of the type having a housing with a drain port and a one-piece valve member carrying a drain port seal normally closing said drain port, said valve member being movable axially into said housing to open said drain port, the improvement wherein said valve member has a shank portion carrying said drain port seal, said shank portion being movable through said drain port, wherein said valve member has a secondary sealing surface fixed in relation to said shank portion for sealing said drain port, and wherein said valve member is movable toward said drain port to extend said shank portion partially through said drain port, thereby exposing said drain port seal while said drain port is closed by said secondary sealing surface, and the improvement wherein said housing includes a hollow, generally tubular housing body, a transversely projecting abutment means is fixed within said housing body adjacent the inner wall thereof, said valve member has a generally cylindrical body portion separated from said shank portion by said secondary sealing surface, the outer diameter of said cylindrical body portion being only slightly smaller than the inner diameter of said housing body, said cylindrical body portion having circumferentially spaced, substantially planar surfaces separated from the inner wall of said housing body by a spacing slightly greater than the transverse extension of said abutment means, one of said spaced surfaces extending from said secondary sealing surface to a first stop surface facing said drain port, the other of said spaced surfaces extending from a second stop surface facing away from said drain port, and said cylindrical body portion having a groove for receiving said abutment means extending between said spaced surfaces.

2. In a drain valve of the type having a housing with a drain port and a valve member carrying a drain port seal normally closing said drain port, said valve member being movable axially into said housing to open said drain port, the improvement wherein said valve member has a secondary sealing surface for sealing said drain port and wherein said valve member is movable toward said drain port to expose said drain port seal while said drain port is closed by said secondary sealing surface, wherein said valve member has a generally cylindrical body portion having first and second flats, the base of said first flat facing said drain port and the base of said second flat facing away from said drain port, wherein an abutment means within said housing is engaged by said base of said first flat in the normally closed position of said valve member, and wherein said valve member has a transition groove in its periphery extending between said first flat and said second flat whereby said valve member may be manipulated to align said transition groove with said abutment means and rotated to position said second flat in confronting relation to said abutment means with said abutment means received by said transition groove during such rotation.

3. A drain valve comprising: housing means including a hollow tubular body member having a valve plate at one end thereof and open at its other end, said valve plate having a drain port coaxial with the longitudinal axis of said tubular body member, said tubular body member having at least one fluid inlet opening therein, a housing cap within said tubular body member and closing said open end thereof; a valve member movable in said body member; spring means coacting between said housing cap and said valve member biasing said valve member toward said drain port; abutment means fixed in said tubular body member projecting from the inner wall thereof, said valve member comprising a generally cylindrical body portion and a reduced diameter shank portion projecting from one end of said body portion and coaxial with said drain port, said shank portion having an annular groove concentric with said axis and receiving a drain port seal and said shank portion having a diameter only slightly smaller than the internal diameter of said drain port, said valve member further having a sloping shoulder between said shank portion and said generally cylindrical body portion thereof, said body portion of said valve member having a first flat extending to said shoulder and terminating in a base facing said drain port, the spacing between said base and said annular groove being substantially equal to the spacing between said abutment means and said drain port whereby said valve member occupies a normally closed position with said base engaging said abutment means and with said drain port seal closing said drain port, said valve member further having a locking groove concentric with said axis and adjacent said shoulder, at least one end of said locking groove terminating in said first flat whereby said drain port may be opened by moving said valve member inwardly of said housing and may be locked in an open position by rotating said valve member whereupon said locking groove receives said abutment means, said valve member further having a second flat parallel to said first flat, said second flat terminating at the open end of said valve member and having a base spaced from said shoulder and facing away from said drain port, said valve member further having a transition groove extending along an arc concentric with said axis and extending between said first flat and said second flat whereby said valve member may be manipulated to position said transition groove in alignment with said abutment means and rotated through 180° to position said second flat in confronting relation to said abutment means, said valve member then being releaseable to permit said bias means to thrust said valve member toward said drain port whereupon said shank portion partially extends out of said drain port to expose said drain port seal and said shoulder seals against the inner edge of said drain port to provide a secondary seal for said drain valve while said drain port seal is exposed.

4. The improvement of claim 3 wherein one end of said transition groove is spaced from the base of said first flat by a distance sufficient that it is not aligned with said abutment means when the base of said first flat is engaged with said abutment means.

5. The improvement of claim 4 wherein said transition groove extends in a clockwise direction only, as viewed from the shank end of said valve member, from said first flat to said second flat.

6. The improvement of claim 4 wherein the other end of said transition groove is spaced sufficiently close to the base of said second flat that said transition groove is positioned to receive said abutment means when the base of said second flat is engaged with said abutment means.

7. The improvement of claim 6 wherein said transition groove extends in a clockwise direction only, as viewed from the shank end of said valve member, from said first flat to said second flat.

8. The improvement of claim 3 wherein said spring means comprises a coil spring and said generally cylindrical body portion of said valve member is hollow to receive one end of said spring, and wherein said housing cap has a recess receiving the other end of said spring.

* * * * *